(12) United States Patent
Kwan et al.

(10) Patent No.: US 7,094,278 B2
(45) Date of Patent: Aug. 22, 2006

(54) MULTI-COLOR WRITING INKS

(75) Inventors: Vincent Kwan, Chicago, IL (US); Philip W. Ambler, Bracknell (GB)

(73) Assignee: Sanford, L.P., Freeport, IL (US)

( * ) Notice: Subject to any disclaimer, the term of this patent is extended or adjusted under 35 U.S.C. 154(b) by 0 days.

(21) Appl. No.: 10/771,974

(22) Filed: Feb. 4, 2004

(65) Prior Publication Data

US 2004/0182278 A1 Sep. 23, 2004

Related U.S. Application Data

(60) Provisional application No. 60/444,724, filed on Feb. 4, 2003.

(51) Int. Cl.
*C09D 11/16* (2006.01)

(52) U.S. Cl. .................. 106/31.27; 106/31.58

(58) Field of Classification Search ............ 106/31.27, 106/31.28, 31.43, 31.75, 31.58, 31.86
See application file for complete search history.

(56) References Cited

U.S. PATENT DOCUMENTS

| | | | |
|---|---|---|---|
| 2,678,634 A | 5/1954 | Henriksen | 120/42.4 |
| 2,957,453 A | 10/1960 | Eckerle | 120/42.4 |
| 2,969,041 A | 1/1961 | Arengo | 120/42.4 |
| 3,201,314 A | 8/1965 | Morshauser et al. | 167/85 |
| 3,849,143 A * | 11/1974 | Hubbard | 401/198 |
| 3,928,554 A * | 12/1975 | Hirschfeld | 435/40.51 |
| 4,490,177 A | 12/1984 | Shioi et al. | 106/23 |
| 4,545,819 A | 10/1985 | Shioi et al. | 106/23 |
| 4,602,886 A | 7/1986 | Smit | 401/35 |
| 4,657,591 A | 4/1987 | Shioi et al. | 106/23 |
| 4,770,557 A | 9/1988 | Pitts | 401/193 |
| 5,307,954 A | 5/1994 | Gick et al. | 222/94 |
| 5,549,742 A * | 8/1996 | Cancellieri | 106/31.32 |
| 5,823,387 A | 10/1998 | Manadanas et al. | 222/1 |
| 6,012,864 A | 1/2000 | Asami | 401/142 |
| 6,056,463 A | 5/2000 | Nishio et al. | 401/47 |
| 6,099,630 A * | 8/2000 | Kobayashi et al. | 106/31.64 |
| 6,224,284 B1 | 5/2001 | Sukhna et al. | 401/198 |
| 6,344,498 B1 | 2/2002 | Allison et al. | 523/161 |
| 6,402,412 B1 | 6/2002 | Sukhna et al. | 401/198 |
| 6,514,328 B1 | 2/2003 | Katoh et al. | 106/31.28 |

FOREIGN PATENT DOCUMENTS

| | | |
|---|---|---|
| EP | 1 112 863 A1 | 7/2001 |
| GB | 2 243 340 A | 10/1991 |
| JP | 09267593 A | 10/1997 |
| JP | 2000025380 A | 1/2000 |
| JP | 2000290566 | 10/2000 |
| JP | 2001070783 | 3/2001 |

OTHER PUBLICATIONS

International Search Report in PCT/US04/03120 dated Jul. 27, 2004.
Written Opinion in PCT/US04/03120 dated Jul. 27, 2004.

* cited by examiner

*Primary Examiner*—J. A. Lorengo
*Assistant Examiner*—Veronica F. Faison
(74) *Attorney, Agent, or Firm*—Marshall, Gerstein & Borun LLP

(57) ABSTRACT

The disclosure is generally related to a multi-color writing ink and, more particularly, to a multi-color writing instrument comprising a mixture of a first ink composition and a second ink composition, wherein the first and second ink compositions are immiscible with each other.

38 Claims, 1 Drawing Sheet

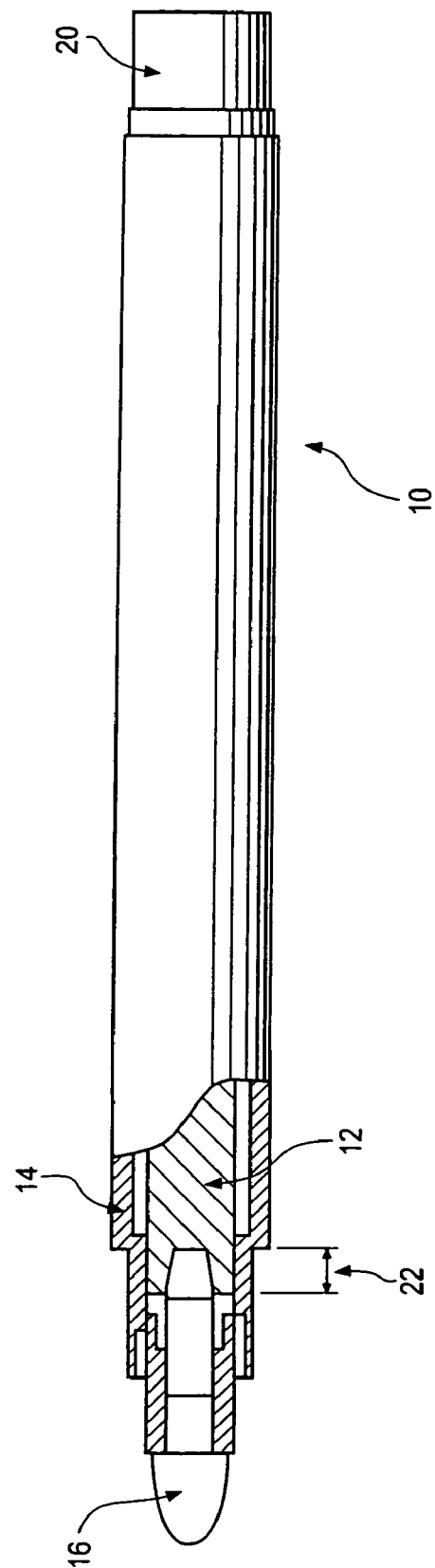

MULTI-COLOR WRITING INKS

CROSS-REFERENCE TO RELATED APPLICATION

This claims the benefit under 35 U.S.C. §119(e) of U.S. provisional patent application Ser. No. 60/444,724 filed Feb. 4, 2003, the entire disclosure of which is hereby incorporated herein by reference.

BACKGROUND OF THE DISCLOSURE

1. Field of the Disclosure

The disclosure is generally related to a multi-color writing ink and, more particularly, to a multi-color instrument containing at least a mixture of a first ink composition and a second ink composition.

2. Brief Description of Related Technology

Most prior art writing instruments, for example, conventional ball point pens, produce only a single color written trace. People, especially children, are fascinated by colors. Therefore, writing instruments capable of producing written traces of multiple colors have been designed, for example, to encourage children to develop motor and writing skills. However, such pens typically incorporate multiple ink refills into the barrels. Consequently, the barrels of such pens are relatively thick compared to pens having a single refill. Additionally, in order to change colors, the user must retract the refill in use and extend another refill. Therefore, the pens are difficult to use, especially for young children. Moreover, each written trace produced by such pens constitutes a single ink composition and is therefore uniformly patterned throughout the written trace.

Crayons that deliver multi-colored written traces have been developed. For example, Sanford Corporation L.P. (Bellwood, Ill.) produces Colorific® Splitz™ and Colorific® Swirl™ crayons, which deliver confetti and block patterned multi-colored written traces, respectively. Such crayons are well-received by children (and their teachers) because the produced written trace includes multiple colors, and the colors of the written trace can change as the user makes a written mark across a substrate such as paper.

Markers capable of producing written traces including multiple colors are also known. However, prior marker systems that simultaneously deliver more than one color from the tip require the manufacturer to connect, presumably via manual means, two individual ink reservoirs to a nib which has been split, presumably manually. Such procedures increase the complexity and cost of manufacturing these marker systems.

BRIEF DESCRIPTION OF THE DRAWING

Exemplary aspects and features of a multi-color writing instrument in accordance with the disclosure are described and explained in greater detail below with the aid of the sole drawing FIGURE, which is a partially cut-away view of an exemplary marker according to the disclosure, the marker including an ink reservoir coupled to a nib.

DETAILED DESCRIPTION

The disclosure provides multi-color writing inks comprising a mixture of a first ink composition and a second ink composition, wherein the first and second ink compositions are immiscible with each other. Such inks may be used in various writing instruments, including, for example, ball point pens, fountain pens, and markers. The disclosed inks are especially well-suited for delivery from fibrous ink reservoirs and writing instruments, such as markers, including the same. The fibers of the ink reservoirs advantageously stabilize the inks such that the individual immiscible ink compositions do not separate out from each other.

Accordingly, the disclosure also provides multi-color markers comprising an ink reservoir containing at least a mixture of a first ink composition and a second ink composition, and a nib in fluid communication with the ink reservoir, wherein the first and second ink compositions are immiscible with each other.

Multi-color markers including three or more ink compositions may also be produced in accordance with the disclosure, provided all of the ink compositions are immiscible in each other, as described herein.

The production of color markers in accordance with the disclosure involves the provision of an intimate mixture of two or more immiscible ink compositions into a single ink reservoir. A nib in fluid communication with an ink reservoir containing two or more immiscible ink compositions will deliver the ink compositions as a mixture, thereby allowing for the production of multi-color written traces on substrates such as paper. Of course, other writing points such as conventional ball points may also be used to produce multi-color written traces in accordance with the disclosure.

The sole drawing FIGURE is a partially cut-away view of an exemplary marker, generally designated 10. The marker 10 includes an ink reservoir 12 disposed in a housing or barrel 14. The ink reservoir 12 is in fluid communication with a porous nib 16. The barrel 14 is sealed by a plug 20 at an end of the barrel 14 opposed to the nib 16, which helps to keep the ink reservoir 12 in place.

Typically, the ink reservoir 12 and the nib 16 are disposed in such a manner relative to each other that the ink composition contained in the ink reservoir 12 can be transferred from the ink reservoir 12 to the nib 16 via migration. In the drawing figure, for example, the reservoir 12 and the nib 16 are shown to be in substantial contact with each other at a coupling zone 22. A change in pressure at the coupling zone 22 (either in the ink reservoir 12 or at the nib 16) can pull the ink composition stored in the ink reservoir 12 across the coupling zone 22 to the nib 16. The ink composition generally moves by capillary action within the reservoir 16, i.e., the ink composition generally moves by capillary action from the distal end of the reservoir 16 to the reservoir end which is proximate to the nib 12. Similarly, the ink composition generally moves within the nib 12 by capillary action, i.e., the ink composition generally moves by capillary action from the portion of the nib 12 which is proximate to the reservoir 16 to the portion of the nib which is applied to a writing surface.

According to a preferred embodiment, the ink reservoir 12 is a wick-type reservoir, and the fibrous nib 16 is in continuous (i.e., permanent) contact therewith. The coupling zone 22 provides a relatively large surface area for ink composition migration from the reservoir 12 to the nib 16.

Ranges may be expressed herein as from "about" or "approximately" one particular value and/or to "about" or "approximately" another particular value. When such a range is expressed, another embodiment according to the disclosure includes from the one particular value and/or to the other particular value. Similarly, when values are expressed as approximations, by use of antecedents such as "about," "at least about," or "less than about," it will be understood that the particular value forms another embodiment.

Immiscible Ink Compositions

Each of the ink compositions in accordance with the disclosure includes at least one solvent and at least one colorant. Preferably, the individual ink compositions should remain immiscible in each other when inside the ink reservoir or alone (i.e., as a stand-alone mixture). Additionally, the immiscibility of the ink compositions should be substantially independent of time or temperature fluctuation. In some embodiments, the individual ink compositions remain immiscible inside the ink reservoirs for periods of greater than about 48 hours, more preferably greater than about 240 hours, even more preferably greater than about 960 hours.

Individual immiscible ink compositions, when contained in an ink reservoir, preferably travel down the ink reservoir toward the nib at substantially similar rates. For applications where the individual immiscible ink compositions should travel along the length of the ink reservoir at substantially similar rates, it may be beneficial to choose immiscible solvents having similar densities (for example, the solvents differ by less than about 0.35 grams per cubic centimeter (g/cm$^3$), less than about 0.25 g/cm$^3$, or less than about 0.20 g/cm$^3$). If one solvent has a significantly different density value from a second solvent, the density difference may cause the two fluids to separate over time along the length of the ink reservoir, especially when the ink reservoir is left in a vertical orientation for an extended period of time.

In order to ensure sufficient immiscibility of the ink compositions, the ink composition solvents should have minimal solubility in one another. For example, one immiscible ink composition solvent should have a solubility of less than about 10 parts per 100 parts other solvent, less than about five parts per 100 parts, or less than about one part per 100 parts.

In one embodiment, an aqueous solvent system and an organic solvent system (which are immiscible) are used as the respective solvents for the first and second immiscible ink compositions. Alternatively, a water-soluble solvent system and an organic solvent system may be used as the respective solvents for the first and second immiscible ink compositions. According to an additional embodiment in accordance with the disclosure, a polar organic solvent system and a non-polar organic solvent system are used as the solvents for the first and second immiscible ink compositions. In yet another embodiment, a polar aprotic solvent system and a non-polar organic solvent system are used as the solvents for the first and second immiscible ink compositions. Safe solvents (for example, water) are preferred, but are not necessary, for use in the markers and writing inks according to the disclosure.

A preferred aqueous/organic solvent mixture for preparation of the immiscible ink compositions is water and dibasic ester solvent. Useful dibasic ester solvents can be obtained from Dupont Nylon (Wilmington, Del.). Dibasic esters are refined dimethyl esters of adipic, glutaric, and succinic acids. Dibasic ester solvents are usually mixtures thereof. Dibasic ester solvents are readily soluble in alcohols, ketones, ethers, and many hydrocarbons, but are only slightly soluble in water and higher paraffins. Accordingly, water and dibasic ester solvents are immiscible with one another. Additionally, water and dibasic ester solvents share similar densities. Other suitable aqueous/organic solvent mixtures providing immiscible ink compositions include water and benzene, and water and xylenes.

Exemplary water-soluble solvent/organic solvent mixtures providing immiscible ink compositions in accordance with the disclosure include methanol and heptane, and methanol and cyclohexane. Exemplary polar organic solvent/non-polar organic solvent mixtures include acetonitrile and hexane, dimethylsulfoxide and cyclohexane, dimethylformamide and cyclohexane, and trichloroethylene and xylenes. Finally, exemplary polar aprotic solvent/non-polar organic solvent mixtures include acetonitrile and hexane, dimethylsulfoxide and cyclohexane, dimethylformamide and cyclohexane, and trichloroethylene and xylenes.

Additionally, in some embodiments, two or more polar organic solvents that are substantially immiscible can be used to provide immiscible ink compositions in accordance with the disclosure. A specific example of such a polar organic/polar organic solvent mixture capable of providing an ink in accordance with the disclosure is dimethylformamide and diisopropylether.

As for the immiscible ink composition colorants, dyes are preferred over pigments as they show more selectivity/solubility in specific solvents. In contrast to dyes, pigments are typically only suspended, and therefore are not solvated. Accordingly, the selectivity of a particular pigment for a single solvent is low. However, some pigments are surface-treated or surface-modified and are therefore more selective towards specific solvents. Such surface-modified pigments may be used in the immiscible ink compositions of the disclosure.

Useful dyes should be selectively soluble in one solvent of the solvent mixture. For instance, a dye which is soluble in the solvent of a first ink composition (for example, water) should be substantially insoluble in the solvent of a second ink composition (for example, dibasic ester solvent). Similarly, a dye which is soluble in the solvent of the second ink composition should be substantially insoluble in the solvent of the first ink composition. For example, a dye soluble in one solvent should have a solubility of less than about 25 parts per 100 parts other solvent, less than about 15 parts per 100 parts, and less than about ten parts per 100 parts. Preferably, the dyes are non-toxic. While some of the exemplified dyes provided herein may be soluble in more than one of ink composition solvents, one of ordinary skill can easily determine if the dyes are soluble in more than one of the ink composition solvents. Moreover, dyes that are soluble in both solvents may be used in addition to dyes that are only soluble in a single solvent (of the chosen solvent system) in order to provide desired colors.

Dyes that are soluble in aqueous solvent systems and/or water-soluble solvents and substantially insoluble in organic solvents include, but are not limited to, anionic dyes and cationic dyes such as basic dyes, acid dyes, direct dyes, and reactive dyes. Specific examples of suitable dyes include, but are not limited to, Food Black No. 1, Food Black No. 2, Food Red No. 40, Food Blue No. 1, Food Yellow No. 7, and the like; FD & C dyes; Acid Black dyes (including Acid Black Nos. 1, 7, 9, 24, 26, 48, 52, 58, 60, 61, 63, 92, 107, 109, 118, 119, 131, 140, 155, 156, 172, 194, and the like); Acid Red dyes (including Acid Red Nos. 1, 8, 32, 35, 37, 52, 57, 92, 115, 119, 154, 249, 254, 256, and the like), Acid Blue dyes (including Acid Blue Nos. 1, 7, 9, 25, 40, 45, 62, 78, 80, 92, 102, 104, 113, 117, 127, 158, 175, 183, 193, 209, and the like); Acid Yellow dyes (including Acid Yellow Nos. 3, 7, 17, 19, 23, 25, 29, 38, 42, 49, 59, 61, 72, 73, 114, 128, 151, and the like); Direct Black dyes (including Direct Black Nos. 4, 14, 17, 22, 27, 38, 51, 112, 117, 154, 168, and the like); Direct Blue dyes (including Direct Blue Nos. 1, 6, 8, 14, 15, 25, 71, 76, 78, 80, 86, 90, 106, 108, 123, 163, 165, 199, 226, and the like); Direct Red dyes (including Direct Red Nos. 1, 2, 16, 23, 24, 28, 39, 62, 72, 227, 236, and the like); Direct Yellow dyes (including Direct Yellow Nos. 4, 11, 12, 27, 28, 33, 34, 39, 50, 58, 86, 100, 106, 107, 118, 127, 132, 142, 157, and the like); anthraquinone dyes, monoazo dyes, disazo dyes, phthalocyanine derivatives including phthalocyanine sulfonates, aza annulenes, formazan copper complexes, triphenodioxazines, Bernacid Red 2BMN; Pontamine® Brilliant Bond Blue A and other Pontamine® dyes available from Bayer Chemicals Corporation (Pittsburgh, Pa.); Cibacron Brilliant Red 3B-A (Reactive Red 4), available from Aldrich Chemical (Milwaukee, Wis.); Drimarene Brilliant Red X-2B (Reactive Red 56), available from Pylam Products, Inc. (Tempe, Ariz.); Levafix Brilliant Red E-4B, Levafix Brilliant Red F-6BA, and similar Levafix® dyes available from Dystar L.P. (Charlotte, N.C.); Procion Red H8B (Reactive Red 31), available from JCI America; Direct Brilliant Pink B Ground Crude, available from Crompton & Knowles; Cartasol Yellow GTF Presscake, available from Sandoz, Inc.; Cartasol Yellow GTF Liquid Special 110, available from Sandoz, Inc.; Yellow Shade 16948, available from Tricon; Basacid Black X34 (BASF X-34), available from BASF; Carta Black 2GT, available from Sandoz, Inc.; Neozapon Red 492 (BASF); Orasol Red G (Ciba-Geigy); Direct Brilliant Pink B (Crompton & Knowles); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (JCI); Morfast Black Concentrate A (Morton-Thiokol); Diazol Black RN Quad (JCJ); Orasol Blue GN (Ciba-Geigy); Savinyl Blue GLS (Sandoz); Luxol Blue MBSN (Morton-Thiokol); Sevron Blue 5GMF (JCJ); Basacid Blue 750 (BASE); Bernacid Red, available from Bemcolors, Poughkeepsie, N.Y.; Pontamine Brilliant Bond Blue; Berncolor A.Y. 34; Telon Fast Yellow 4GL-175; BASF Basacid Black SE 0228; various Reactive dyes, including Reactive Black dyes, Reactive Blue dyes, Reactive Red dyes including Reactive red 180, and the like, Reactive Yellow dyes including Reactive yellow 37, as well as mixtures thereof.

Dyes that are soluble in organic solvents and/or non-polar organic solvents and substantially insoluble in aqueous solvent systems and water-soluble solvents include any dyes that can be dissolved in an organic solvent and exhibit the solubility characteristics described with respect to the second solvent of the solvent mixture. These dyes include, but are not limited to, disperse dyes, modant dyes, oxidation dyes, reactive dyes, solvent dyes, sulfur dyes, and vat dyes. Illustrative examples of organic solvent soluble dyes that will remain dissolved in the organic phase and will not become substantially solvated by the aqueous phase (i.e., are substantially insoluble in the aqueous phase) include azo dyes, such as Sudan Black commercially available from Fisher, Inc.; Sudan I, and nigrosine commercially available from Aldrich Chemical; Sudan II, commercially available from Aldrich Chemical; and other classes of dyes such as Yellow Dyes commercially available from Pylam Products, Inc.; Neozapan Red GE, available from BASF Chemical Company; Oil Blue A dyes, available from E. I. duPont; Methyl Violet 1 B, available from Aldrich Chemical; Sudan Red BB, commercially available from BASF Chemical Company; Sudan Red 7B, Sudan Black B, Sudan Yellow 146, Neozapon Blue, Oracet Yellow GN, available from Ciba-Geigy; BASF Sudan Yellow 150, BASF Sudan Red 7B, Oil Yellow, Bayer Ceres Red 3R, Orient Chemical, Ltd.; Oil Pink 312, Pylam Pylakrome Pink LX 1900, Bayer Ceres Blue R, BASF Neozapon 807, BASF Sudan Deep Black, Bayer Ceres Black BN; and the like. Solvent dyes like Solvent Yellow 14, 28, 56; Solvent Red 1, 24, 49; Solvent Blue 4, 35, 36; Solvent Black 5, 7 and the like are also applicable.

Dyes that are soluble in polar organic solvents and/or aprotic polar organic solvents and substantially insoluble in non-polar organic solvents include Sudan Yellow 146; Sudan Orange 220; Fluorol Green Gold 084 and Fluorol Yellow 084 (all from BASF, Germany).

Dyes that are soluble in one polar organic solvent (for example, dimethylformamide) and not in a second polar organic solvent (for example, diisopropylether) include CI Natural Red 26 (Safflower Red or carthamic acid) and dyes based on perylenetetracarboxylic diimide. Dyes that are soluble in the exemplary second polar organic solvent provided above but not in the exemplary first polar organic solvent include Sudan Blacks.

The colorant concentration for the immiscible ink compositions may be varied as long as there is enough of each color so that multi-color traces are produced. Normally, a colorant concentration of at least about 0.0005 weight percent (wt. %), based on the weight of the solvent plus colorant, is used. More preferably, a dye concentration of at least about 0.1 wt % is used. In other aspects, dye concentrations of at least about 0.5 wt. % are used.

The immiscible ink compositions may be mixed at any ratio as long as multiple colors are noticeable in any written marks produced with a writing instrument incorporating the same. For example, the immiscible ink compositions may be mixed at a ratio from about 0.1 part to about 99.9 parts. A ratio of about one part to about one part can be used, though in some cases, one immiscible ink composition is used in excess of the other(s). For example, a suitable solvent ratio of the second solvent to the first solvent is at least about one part to about 25 parts, at least about one part to about 20 parts, at least about one part to about 10 parts, at least about one part to about five parts, and at least about one part to about two parts. The more polar solvent is typically the predominant solvent in the solvent mixtures. However, in some embodiments, for example, where ink reservoirs have been modified to have non-polar fibers, the less polar solvent in the solvent mixture may be provided in excess.

The viscosity of the immiscible ink compositions of the disclosure at 25° C. is usually less than about 20 cps (centipoises), preferably from about 1 cps to about 10 cps, and more preferably from about 1 cps to about 5 cps. However, this range can be drastically shifted according to the nature and porosity of the nibs and the ink reservoirs used in the marker systems.

The ink compositions may optionally contain other additives such as biocides, surface tension modifiers, binding resins, surfactants, humectants, or other suitable additives as long as the added component(s) will not adversely affect the non-miscible nature of the ink compositions in the mixture. In other words, the various colors should remain substantially distinct even in the presence of these additives.

Ink Reservoir

To ensure continual separation and simultaneous delivery of the immiscible ink compositions contained in the mixture, the ink reservoir should be inert to the ink compositions and allow all of the ink compositions to travel at similar rates along the length of the reservoir. An example of such an ink reservoir is a melt-blown fibrous reservoir from Filtrona Company (Colonial Height, Va.). The dimension of the ink reservoir can be varied to fit the size of the outer barrel selected for the multi-color marker.

Suitable ink reservoirs for use in the markers according to the invention preferably have a reservoir fiber density between about 0.10 gram/cubic centimeter (g/cc) and about 0.50 g/cc.

The reservoir fibers can be manufactured from thermoplastic polymers such as, for example, polyesters, nylons, polypropylenes, and mixtures thereof. The fibers inside the reservoir can be linearly-oriented or entangled. To maintain the integrity of the ink reservoir towards aggressive solvents, the reservoir may be wrapped with a sheet of polypropylene or nylon. The reservoirs can be of any dimensions as long as the dimensions are sufficient for storing a predetermined amount of ink and for permitting the reservoir to fit into the desired marker body or other writing instrument housing.

Nib

The nib should allow continual separation and simultaneous delivery of the immiscible ink compositions contained in the ink reservoir. Fibers of the nib should be compatible with the various solvent systems of the ink compositions and capable of retaining the ink composition. The nib fibers should be "neutral," i.e., the nib should not show preference towards one of the immiscible ink compositions. An exemplary nib is a polyester/urethane nib supplied by Teibow (GW402).

Suitable nib fibers can be manufactured from thermoplastic polymers such as, for example, polyester, polypropylene, nylon, and mixtures thereof. The nib fibers are typically bound by a second resin, which also should be insoluble in the ink composition solvent system. Exemplary resins include polyacetal and melamine.

Multi-color writing inks and markers in accordance with the disclosure can be better understood in light of the following examples, which are merely intended to illustrate the inks and markers, and are not meant to limit the scope in any way.

EXAMPLE 1

0.5 grams of FD&C Blue #1 (Warner-Jenkinson, St. Louis, Mo.) was added to 99.5 grams of de-ionized water to form Solution A. 0.5 grams of Solvent Red 68 (Spectra Colors, Kearny, N.J.) was dissolved in 99.5 grams of dibasic ester DBE (Dupont, Orange, Tex.) to form Solution B. Ten mL of Solution A was mixed vigorously with the same quantity of Solution B, and the mixture was injected using a syringe into an ink reservoir. The reservoir was inserted into a marker barrel and an appropriate nib was inserted in the other end. The marker was left in a horizontal position for about 30 minutes. A random dual color trace was produced when this marker was applied to paper.

The same ink system can also be used in a free-ink marker. Example 2 illustrates such an application.

EXAMPLE 2

2 mL of the mixture of Solution A and B in Example 1 were injected into one of the cavities of an Accent Insight marker body (Sanford Corporation, Bellwood, Ill.). The original nib and ink buffer (i.e., ink collector) were re-installed into the marker. A dual color trace was produced after placing the marker horizontally for about 5 minutes.

Instead of preparing two solutions separately, it is possible to prepare the ink composition mixture in one container. A procedure illustrating this approach is provided in Example 3.

EXAMPLE 3

20 grams of deionized water was added to 20 grams of DBE. The mixture was stirred vigorously. 0.1 grams of FD&C Blue 1 and 0.1 grams of Solvent Red 68 were added to the solvent mixture. The resulting mixture was stirred for 20 minutes. While mixing, an aliquot of the mixture was removed and injected into a reservoir. A marker was made out of this mixture using procedure detailed in Example 1. A random red and blue trace was observed upon application of this marker to paper.

Results and Discussion

The markers prepared by the foregoing examples have been subjected to room temperature aging as well as accelerated aging experiments. The markers had been shown to produce multi-color written traces even after four weeks in a 50° C. oven.

These markers also enjoy a long cap-off time. Thus, the markers deliver dual-color traces immediately, even after the cap has been taken off for more than two weeks (at ambient conditions). Such a lengthy cap-off time is beneficial, for example, when children use the markers and neglect to replace the cap.

Although the foregoing text is a detailed description of numerous different embodiments of a multi-color marker, the detailed description is to be construed as exemplary only and does not describe every possible embodiment of a multi-color marker in accordance with the disclosure.

What is claimed is:

1. A multi-color writing ink, consisting essentially of: a mixture of a first ink composition consisting essentially of a first solvent, a first dye, and optionally at least one ink additive, and a second ink composition consisting essentially of a second solvent, a second dye, and optionally at least one ink additive, wherein the first and second ink compositions are immiscible with each other, the first ink composition comprises at least about 0.1 weight percent of the first dye, and the second ink composition comprises at least about 0.1 weight percent of the second dye.

2. The multi-color ink according to claim 1, wherein the first solvent is substantially insoluble in the second solvent.

3. The multi-color ink according to claim 1, wherein the first dye is substantially insoluble in the second solvent.

4. The multi-color ink according to claim 1, wherein the second dye is substantially insoluble in the first solvent.

5. The multi-color ink according to claim 1, wherein a density of the first solvent and a density of the second solvent differ by less than about 0.35 grams per cubic centimeter ($g/cm^3$).

6. The multi-color ink according to claim 1, wherein a ratio of the second solvent to the first solvent is at least about one part to about 25 parts.

7. The multi-color ink according to claim 1, wherein the first solvent is an aqueous solvent and the second solvent is an organic solvent.

8. The multi-color ink according to claim 7, wherein the first solvent is water and the second solvent is dibasic ester solvent.

9. The multi-color ink according to claim 7, wherein the first solvent is water and the second solvent is selected from the group consisting of benzene and xylenes.

10. The multi-color ink according to claim 7, wherein the first dye is selected from the group consisting of anionic dyes and cationic dyes.

11. The multi-color ink according to claim 7, wherein the first dye is selected from the group consisting of basic dyes, acid dyes, direct dyes, and reactive dyes.

12. The multi-color ink according to claim 7, wherein the second dye is selected from the group consisting of disperse dyes, mordant dyes, oxidation dyes, reactive dyes, solvent dyes, sulfur dyes, and vat dyes.

13. The multi-color ink according to claim 1, wherein the first solvent is a water-soluble solvent and the second solvent is an organic solvent.

14. The multi-color ink according to claim 13, wherein the first solvent is methanol and the second solvent is selected from the group consisting of heptane, hexanes, and cyclohexane.

15. The multi-color ink according to claim 13, wherein the first dye is selected from the group consisting of anionic dyes and cationic dyes.

16. The multi-color ink according to claim 13, wherein the second dye is selected from the group consisting of disperse dyes, mordant dyes, oxidation dyes, reactive dyes, solvent dyes, sulfur dyes, and vat dyes.

17. The multi-color ink according to claim 1, wherein the first solvent is a polar organic solvent and the second solvent is a non-polar organic solvent.

18. The multi-color ink according to claim 17, wherein the first solvent is selected from the group consisting of acetonitrile, dimethylsulfoxide, dimethylformamide, and trichloroethylene, and the second solvent is selected from the group consisting of heptane, cyclohexane, hexanes, and xylenes.

19. The multi-color ink according to claim 1, wherein the first solvent is a polar aprotic solvent and the second solvent is a non-polar organic solvent.

20. The multi-color ink according to claim 1, wherein the first solvent is a polar organic solvent and the second solvent is a polar organic solvent.

21. The multi-color ink according to claim 20, wherein the first solvent is dimethylformamide and the second solvent is diisopropylether.

22. A multi-color marker, comprising:
a fibrous ink reservoir containing at least a mixture of a first ink composition comprising a first solvent and a first colorant and a second ink composition comprising a second solvent and a second colorant; and,
a fibrous nib in fluid communication with the fibrous ink reservoir, wherein the first and second ink compositions are immiscible with each other.

23. The multi-color marker according to claim 22, wherein the first solvent is substantially insoluble in the second solvent.

24. The multi-color marker according to claim 22, wherein the first and second colorants are selected from the group consisting of dyes and surface-modified pigments.

25. The multi-color ink marker according to claim 22, wherein the first colorant is substantially insoluble in the second solvent.

26. The multi-color marker according to claim 22, wherein the second colorant is substantially insoluble in the first solvent.

27. The multi-color marker according to claim 22, wherein a density of the first solvent and a density of the second solvent differ by less than about 0.35 grams per cubic centimeter ($g/cm^3$).

28. The multi-color marker according to claim 22, wherein a ratio of the second solvent to the first solvent is at least about one part to about 25 parts.

29. The multi-color marker according to claim 22, wherein the first solvent is an aqueous solvent and the second solvent is an organic solvent.

30. The multi-color marker according to claim 29, wherein the first colorant is selected from the group consisting of anionic dyes and cationic dyes.

31. The multi-color marker according to claim 29, wherein the second colorant is selected from the group consisting of disperse dyes, mordant dyes, oxidation dyes, reactive dyes, solvent dyes, sulfur dyes, and vat dyes.

32. The multi-color marker according to claim 22, wherein the first solvent is a water-soluble solvent and the second solvent is an organic solvent.

33. The multi-color marker according to claim 22, wherein the first solvent is a polar organic solvent and the second solvent is a non-polar organic solvent.

34. The multi-color marker according to claim 22, wherein the first solvent is a polar aprotic solvent and the second solvent is a non-polar organic solvent.

35. The multi-color marker according to claim 22, wherein the first solvent is a polar organic solvent and the second solvent is a polar organic solvent.

36. The multi-color writing ink according to claim 1, wherein the additive is selected from the group consisting of biocides, surface tension modifiers, binding resins, surfactants, and humectants.

37. The multi-color marker according to claim 22, wherein the first ink composition comprises at least about 0.1 weight percent of the first colorant, the second ink composition comprises at least about 0.1 weight percent of the second colorant, and the first and second colorants are dyes.

38. A multi-color writing ink, comprising:
a mixture of a first ink composition comprising a first solvent and a first colorant and a second ink composition comprising a second solvent and a second colorant, wherein the first and second ink compositions are immiscible with each other, and the first solvent is water and the second solvent is dibasic ester solvent or the first solvent is dimethylformamide and the second solvent is diisopropylether.

* * * * *